United States Patent [19]

Nakaya et al.

[11] Patent Number: 4,588,759
[45] Date of Patent: May 13, 1986

[54] AQUEOUS COATING COMPOSITION AND PREPARATION THEREOF

[75] Inventors: Toshiharu Nakaya, Kyoto; Akimitsu Uenaka, Hyogo; Takanobu Ueda, Hirakata, all of Japan

[73] Assignee: Nippon Paint Co., Ltd., Osaka, Japan

[21] Appl. No.: 622,062

[22] Filed: Jun. 18, 1984

[30] Foreign Application Priority Data

Jun. 18, 1983 [JP] Japan ................. 58-109610

[51] Int. Cl.$^4$ ............................................. C08L 63/00
[52] U.S. Cl. ..................... 523/414; 523/403; 523/404; 523/412; 523/413; 523/420; 523/426
[58] Field of Search ............... 523/403, 404, 412, 413, 523/414, 420, 426

[56] References Cited

U.S. PATENT DOCUMENTS

| | | | |
|---|---|---|---|
| 4,312,795 | 1/1982 | Taguchi et al. | 523/403 |
| 4,356,276 | 10/1982 | Honig et al. | 523/404 |
| 4,442,247 | 4/1984 | Ishikura et al. | 523/412 |
| 4,442,248 | 4/1984 | Kanda et al. | 523/412 |

FOREIGN PATENT DOCUMENTS 50-65531  6/1975  Japan ................. 523/403

Primary Examiner—Lewis T. Jacobs
Attorney, Agent, or Firm—Wenderoth, Lind & Ponack

[57] ABSTRACT

Aqueous coating composition comprising water insoluble resinous powder, aqueous resin, pigment and other optional additives including hardener, characterized by the fact that said water insoluble resinous powder is composed of a polymer obtained by reacting a mixture of epoxy resin and a resin having epoxy reactive functional groups, or a resin having both epoxy groups and epoxy reactive functional groups, with an amine in an amount sufficient to cause ring-opening of 10 to 50% of the total epoxy groups, or composed of carboxyl bearing resin admixed and reacted with high boiling basic compound. These compositions are excellent in storage stability, application characteristics and film performance.

21 Claims, No Drawings

AQUEOUS COATING COMPOSITION AND PREPARATION THEREOF

FIELD OF INVENTION

The present invention relates to an aqueous coating composition and more specifically, an aqueous coating composition with excellent storage stability and the like. The invention also concerns the preparation of said composition.

BACKGROUND OF THE INVENTION

An aqueous coating composition comprising resinous powder uniformly dispersed in an aqueous resin solution is, because of its well balanced characteristics of good flowability due to the aqueous resin and capability of forming a thicker film due to the powdered resin, free from the generic drawback possessed by aqueous resins of sagging and is capable of excellent pinhole resistance. Hence, it far surpasses other resins in the application characteristics thereof. However, in such a powdered resin dispersion type aqueous coating composition, there is indeed excellent application characteristics at an earlier stage, but there is a serious problem of lowered pinhole resistance of the composition, one of the important application characteristics, after storing at an elevated temperature, of the composition. To solve the question of this change of stability with time at an elevated temperature, the inventors have studied the subject in depth, and found that when a carboxyl bearing resin is selected as a powder forming resin and is combined with a basic pigment and base neutralized aqueous resin, thereby masking the carboxyl groups of said powdered resin with the said basic pigment and making them inert in the system, there is obtained a coating composition which is excellent in high temperature stability with time and storage stability, without the deterioration of application characteristics thereof. On the basis of these findings, Japanese Patent Application No. 73674/82 was filed on Apr. 30, 1982. It was published as Kokai (unexamined publication) No. 189,267 on Nov. 4, 1983. According to the said invention, both storage stability and pinhole resistance with time of the resinous powder dispersion type aqueous coating composition are indeed improved, but further improvements are still needed in both respects.

Under the circumstances, the inventors, having endeavored to obtain these results, have found that if the water insoluble resin is composed of a considerably higher molecular weight polymer produced by treating a specific type of resin with amine, the swelling dissolution of such resinous powder in the system with time is effectively controlled, and high temperature stability with time of the resultant coating composition is markedly improved because of the improvement in viscoelastic change and effective control of the curing speed thereof.

Having further developed the invention of said Japanese Kokai No. 189267, the inventors have also found that if the masking amine for the carboxyl bearing resin is selected from the member having a higher boiling temperature, the curing speed is effectively and advantageously controlled, thereby giving particularly excellent application characteristics and curing properties to the composition. Of course, the combination of the abovesaid two inventions may give particularly good results in respect of storage stability, application characteristics, curing properties and the like. On the basis of these findings, the present invention has been made.

SUMMARY OF THE INVENTION

Thus, in accordance with the invention, is provided an aqueous coating composition comprising water insoluble resinous powder, base neutralization type aqueous resin, pigment and other optional additives including hardeners, characterized by the fact that said water insoluble resinous powder is composed of polymer obtained by reacting a mixture of epoxy resin and a resin having both epoxy groups and epoxy reactive functional groups, or a resin having both epoxy groups and epoxy reactive functional groups, with an amine in an amount which is sufficient to cause ring-opening of 10 to 50% of the total epoxy groups.

The invention also provides an aqueous coating composition comprising carboxyl bearing resinous powder (I), basic compound (II), aqueous resin (III) and other optional additives including the compound (IV) which is reactive with said (I) and/or (III), the amount of said basic compound being 0.3 to 1.2 equivalents based on the total amount of carboxyl groups in (I) and (III) and the solid weight ratio of (I):(III) being 2:98 to 98:2, characterized by the fact that at least 20% of said basic compound (II) is one having a boiling temperature of more than 150° C.

The invention also provides an aqueous coating composition as stated in the first embodiment which is characterized by the fact that an amine having a boiling point of 150° C. or more is used as the said amine to be reacted with the epoxy groups and/or for neutralization of the aqueous resin.

Preferred embodiments of the invention The resinous powder used in the present invention is composed of a polymer obtained by reacting a mixture of epoxy resin and a resin having epoxy reactive functional group, or a resin having both epoxy group and epoxy reactive functional group, with an amine in an amount which is sufficient to cause ring-opening of 10 to 50% of the total number of groups.

As the epoxy resins, various types of resins have been known including those prepared by the reaction of bisphenol A and epichlorohydrin, and any of the members may satisfactorily be used for the purpose of this invention. Most typical members of the resin having epoxy reactive functional groups are, for example, acrylic resins and polyester resins each having carboxyl groups, and however, the invention shall not be limited to these members only and any of the resins having epoxy reactive functional group as amino, imino, acid amide or the like may satisfactorily be used. As an example of the resin having both epoxy groups and epoxy reactive functional groups (e.g. carboxyl groups), mention is made of epoxy modified acrylic resins like Finedic A 217 manufactured by Dainippon Ink Co., Ltd., which is also advantageously used as the resinous powder constituting the polymer of this invention.

In order to simplify and assist easy understanding of the invention, an explanation shall be given with respect to using a resinous powder composed of epoxy resin and carboxyl containing acrylic resin. Since the reaction rate of epoxy resin with carboxyl containing acrylic resin is rather poor, mere mix-melting is insufficient to obtain the desired highly polymerized product. However, when an amine is present in the system, there occurs ring-opening of the epoxy group and this results a highly polymerized resin through polycondensation of the epoxy resin per se or reaction with carboxyl bearing acrylic resin.

In the present invention, use is made of a resinous powder of such highly polymerized, water insoluble resin obtained by the reaction of a mixture of epoxy resin and a resin having epoxy reactive functional groups, or a resin having both epoxy groups and epoxy reactive functional group, with an amine, the amount of said amine being sufficient enough to cause ring-opening of 10 to 50% of the total epoxy groups contained.

Usually, it has been known in the art that melt-mixing of epoxy resins and carboxyl bearing acrylic resins will give only limited extent, e.g. 3 to 5%, or ring-opening of the contained epoxy groups. With such extent of ring-opening, the present polymerization effect cannot be expected therewith. When an amine is added to the system, the extent of said ring-opening of epoxy groups is increased proportionally with the increase in said amine quantity.

However, an excessive amount of amine is not recomended because if the ring-opening exceeds over 50% of the total epoxy groups, there results an excessively polymerized product, which is inadequate for attaining the object of the invention due to the formation of granulation in the composition and difficult dispersion thereof. Thus, the inventors have found that when the epoxy ring-opening rate is within 10 to 50% of the total epoxy groups, an optimum coating composition with good dispersion properties and storage stability may be obtained, and most preferably, the epoxy ring-opening rate is 15 to 30% of the total epoxy groups. On the basis of these findings, the present invention has been made.

The abovementioned resinous powder used in the present invention may advantageously be prepared by mixing, for example, epoxy resin and epoxy reactive functional group bearing resin, e.g. carboxyl bearing acrylic resin, each in powder form, and after adding an amount of amine, subjecting it to melt-mixing.

At this time, the amine amount is determined so as to give a 10 to 50% epoxy ring-opening rate calculated by the formula:

$$A - B/A \times 100$$

wherein A stands for the amount of epoxy groups in the composition of epoxy resin and epoxy reactive functional group bearing resin, and B is the amount of epoxy groups in the final product obtained by melt-mixing the abovesaid two resins and amine.

After cooling, the product is pulverized and sieved to obtain a powder whose mean diameter is less than 300μ. The thus obtained powder is desirably dispersed in an aqueous medium. In the final aqueous coating composition, the resinous powder may have in general a mean diameter of 0.3 to 40μ and however, this is not essential in the invention and any powders having a more fine particle size may be likewise useful. In any event, the mean diameter may be selected appropriately within a range customarily used in the art concerned. Thus, the abovementioned reaction product may be further pulverized by mechanical means as, for example, fluid energy mill and thus obtained fine powder may be added to an aqueous medium.

As regards the temperature at which the abovementioned resins and amine are melted together, it may appropriately be selected depending essentially on the type of resinous component. For example, in the case of the combination of epoxy resin and carboxyl bearing acrylic resin, it is generally determined to be in the range of 90° to 110° C.

As an amine component, no particular requirements are need be observed. However, if the boiling point of the employed amine is lower than the abovesaid melting temperature, there is a fear the amine will dissipate out of the system during said reaction and consequently, some effective controlling means or employment of larger quantity of amine is essential in that case and thus the reaction control will become difficult. Therefore, it is preferred to use an amine with a much higher boiling point than the abovesaid melting temperature.

The inventors have also found that particularly preferred members are amines which are solid at room temperature and have a comparatively higher boiling point as, for example, aliphatic monoamines having more than 12 carbon atoms.

In the present invention, the abovesaid resinous powder(s) is (are) used together with base neutralization type aqueous resin and pigment.

Examples of said base neutralization type aqueous resin used in the present invention are alkyd resins, polyester resins, maleic oil resins, maleic polyalkadiene resins, epoxy resins, acrylic resins, urethane resins and the like.

Introduction of carboxyl groups in a particular resin may be carried out in a conventional way as, for example, selection of appropriate monomers to be polymerized, control of polymerization reaction and the like.

More specifically, in the case of alkyd and polyester resins, carboxyl groups may be introduced into the resins at the stage wherein polybasic acid and polyhydric alcohol are reacted with each other. In the case of maleic oil resins, carboxyl groups may be advantageously introduced when a drying oil (linseed oil, castor oil, soya-bean oil, tung oil) is treated with maleic anhydride.

In the case of maleic polyalkadiene resins, carboxyl groups may be introduced by the addition of polybutadiene (e.g. 1,2-polybutadiene, 1,4-polybutadiene, 1,2- and 1,4-copolymerized polybutadiene), polyisoprene or polycyclopentadiene, with unsaturated carboxylic acid (e.g. maleic anhydride, hymic anhydride, fumaric acid, itaconic acid).

As the epoxy resins, use can be made of various type typically exemplified by the reaction product of bisphenol A and epichlorohydrin, as well as various compounds with epoxy groups. Some of these resins are water soluble in nature and they are directly used as aqueous resins. If less soluble, acidic groups may be introduced into a part or all oxirane groups, thereby making them water soluble.

In the case of acrylic resins, they may be prepared by copolymerizing α,β-unsaturated carboxylic acid (e.g. acrylic acid, methacrylic acid, cinnamic acid, crotonic acid, fumaric acid, citraconic acid, maleic anhydride) and acrylic ester (e.g. methyl, ethyl, propyl, butyl, hexyl, lauryl ester) and/or methacrylic ester (e.g. methyl, ethyl, propyl, butyl, hexyl, lauryl ester), and if required, other polymerizable monomers.

In the case of urethane resins, use can be made of the products having a skeletal structure, of a diisocyanate compound (e.g. hexamethylene diisocyanate, tolylene diisocyanate, xylylene diisocyanate, 4,4'-methylene bis(-cyclohexyl isocyanate), isophorone diisocyanate).

For the solubilization of such aqueous resin in an aqueous medium, the abovesaid carboxyl groups may be neutralized with a basic material (e.g. monomethyl-amine, dimethylamine, trimethylamine, monoethylamine, diethylamine, triethylamine, monoisopropylamine, diisopropylamine, diethylene triamine, triethylene tetramine, monoethanolamine, diethanolamine, triethanolamine, monoisopropanolamine, diisopropanolamine, dimethylethanolamine, morpholine, methyl morpholine, piperazine, ammonia, sodium hydroxide, potassium hydroxide, lithium hydroxide.)

Preferably said basic material may also be an amine having a higher boiling point of 150° C. and more.

As the pigment, any of the members customarily used in the paint area, may be satisfactorily used.

In the present invention, the is provided an aqueous coating composition comprising abovesaid resinous powder, aqueous resin and pigment, uniformly dispersed in an aqueous medium. The said aqueuous medium (preferably deionized water) may contain a small amount of water-miscible, organic solvent as, for example, ethyleneglycol monomethyl ether, ethyleneglycol monoethyl ether, ethyleneglycol monobutyl ether, methanol, ethanol, isopropyl alcohol, n-butyl alcohol, sec-butyl alcohol, t-butyl alcohol, dimethyl formamide and the like.

In the present coating composition, the abovesaid resinous powder and aqueous resin are compounded in a solid weight ratio of 2:98 to 98:2, preferably 2:98 to 60:40.

If the amount of said resinous powder is excessively lower, there is a trend that application characteristics will get worse, whereas if it is excessively higher, then there may be inferior flowability.

It has also been found that at the level of 40 wt% and more of the aqueous resin in the total resins, particularly good results are obtained in respect of application characteristics, coating appearance and gloss.

In the present coating composition, there may also be contained as desired, a compound which is reactive with the water insoluble resinous powder and/or aqueous resin, that is, a hardening agent. Examples of such compounds are melamine resins, polyvalent metal salt (e.g. cobalt naphthenate, lead naphthenate, zinc naphthenate), triglycidyl isocyanurate (TGIC), dicyandiamide and the like. When added, its compounding ratio is, in terms of solid weight ratio, determined so as to be less than 4 times the amount of water insoluble resin and/or aqueous resin. By the adoption of such hardening agent, there may be obtained a coating with much improved film performance because of the occurrence of a cross-linking reaction in the heat-curing step.

The present composition may further include other conventional additives such as modifying agents, dispersing aids, surface regulators and the like, as desired.

The present coating composition may be advantageously prepared by compounding the abovementioned components in any known manner and mixing well to obtain a uniform dispersion. In a preferred embodiment, the present aqueous coating composition may be prepared by mixing a combination of epoxy resin and epoxy reactive functional group bearing resin, or a resin having both epoxy group and epoxy reactive functional group, with an amine, melting the same to effect ring-opening of 10 to 50% of the epoxy groups contained, pulverizing thus obtained reaction product and sieving to obtain fine particles having a mean diameter of less than 300µ, mixing and dispersing the fine powder in an aqueous medium containing base neutralization type aqueous resin, and compounding the mixture with pigment and other optional additives including hardening agents.

In one other embodiment, the present coating composition may be prepared by adding to the abovementioned reaction product of said resin(s) and amine, with pigment, melting the same to obtain mixed powder, pulverizing the same by means of a fluid energy mill to a fine powder of less than 50µ, and finally dispersing the fine powder into an aqueous medium containing a base neutralization type aqueous resin by means of disperser at 40° C. or less.

Thus obtained aqueous coating composition of this invention possesses the characteristics of high solid coating composition comprising aqueous resin and resinous powder, and is characterized by having far improved storage stability and elevated temperature—longer time stability and pinhole resistance of the coating.

As already stated, in the most preferred embodiment of the invention, the amine substance used for the reaction with epoxy groups for the purpose of higher polymerization of water insoluble resin and for the reaction with aqueous resin for neutralization purpose of said resin should preferably be a member having a higher boiling point of 150° C. and more, most preferably 150°~400° C.

In this case, particularly excellent results in respect of storage stability and application characteristics may be obtained because of the combination characteristics of highly polymerized water insoluble resin powder and controlled vaporization of the used amine from the aqueous resin. The latter feature may exert good effects on the curing properties of the coating composition.

In the second aspect of this invention, there is provided an aqueous coating composition comprising carboxyl bearing resinous powder, basic compound and aqueous resin and being excellent in storage stability and application characteristics (pinhole resistance and sagging resistance), which is characterized by the fact that at least 20% of said basic compound has a high boiling temperature of more than 150° C., preferably 150° to 400° C.

In this invention, the most characteristic feature resides in the employment of a high boiling basic compound for the masking of carboxyl groups of resinous powder, as well as the solubilization of aqueous resin.

Examples of such members are diethylethanolamine (B.p. 163° C.), 2-(dimethylamino)-2-methylpropanol(DMAMP, 160° C.), diisopropanolamine (249° C.), dimethyl-2-(2'-hydroxyethoxy)ethylamine (DMAEE, 200° C.), aminoethyl ethanolamine (244° C.), diethanolamine (268° C.), and triethanolamine (360° C.).

As the carboxyl bearing resinous powder (I), mention is made of, for example, polyester resin and acryl resin, which are well known in the art. The grain size of the powder may have an effect on time-stability and application characteristics of the composition and appearance of the coating thereof and it is usually selected within a range of 3 to 60µ, preferably 5 to 25µ. The resinous acid value is usually 15 to 300, preferably 30 to 100. If the resinous acid value is lower than the abovementioned range, then one is unable to expect an effective crosslinking, curing reaction, whereas if this value is too high, then there remains considerable quantities of free carboxyl groups in the coating, which will undesirably affect water resistance.

The invention shall be now more fully explained in the following Examples. Unless otherwise being stated, all parts are by weight.

EXAMPLE 1 (METHOD 1)

(1) Preparation of resinous powder:

8 Parts of Finedic M-6103 (polyester resinous powder, manufactured by Dainippon Ink Co., acid value 70, Tm 110° C., molecular weight 3000, particle size less than 104μ), 8 parts of Epicoat #1004 (epoxy resinous powder, manufactured by Shell Co., epoxy equivalent 1000, molecular weight 1400), 10 parts of BF-10 (precipitated barium sulfate pigment, manufactured by Sakai Kagaku) and 0.32 part of lauryl amine were mixed and fused together in kneader at 110° C. After cooling, the product was pulverized and sieved to obtain powders having a mean diameter of less than 105μ. The epoxy ring-opening rate of this powdered resin is shown in Table 1.

(2) Preparation of powder paste:

52 Parts of resinous powder obtained in (1), 42 parts of aqueous polyester resin varnish (acid value 55, hydroxyl number 35, molecular weight 1360, employed neutralizing agent dimethylethanolamine, neutralization rate 80%, non-volatile content 50 wt%, pH 6.6) and 30 parts of deionized water were uniformly mixed together and dispersed in a disperser at 70° C. for 15 minutes to obtain a stable dispersion of fine resinous powder (less than 30μ, measured by grindometer, Method A).

(3) Preparation of pigment paste:

42 Parts of the same aqueous polyester resin varnish as used in the preceding paragraph (2), 30 parts of deionized water and 53 parts of Titanium R-820 (titanium oxide pigment, manufactured by Ishihara Sangyo K.K.) were mixed and dispersed well in a paint conditioner with glass beads, for 30 minutes to obtain a pigment paste (viscosity 86 Ku/25° C., grain size less than 10μ, measured by grindometer, Method A)

(4) Preparation of aqueous coating composition:

124 Parts of the powder paste of paragraph (2) and 125 parts of the pigment paste of paragraph (3) were uniformly mixed together and then added with 20 parts of Cymel 300 (melamine resin, manufactured by Mitsui Cyanamide Co.).

The weight ratio of resinous powder/water soluble polyester resin was 43/57.

(5) Coating test:

The coating composition of the preceding paragraph (4) was diluted with pure water to #4 Ford Cup viscosity of 30 sec./20° C.

Each aliquot portion of the diluted composition was, immediately after dilution, after storing at 40° C. for 10 days, at 40° C. for 20 days, and at 40° C. for 30 days, applied by spraying on a steel plate, set for 5 minutes and baked at 150° C. for 30 minutes.

The maximum film thickness showing resistance against the generation of pinholes for the respective composition was measured and shown in Table 1.

EXAMPLE 2

The same procedures as stated in Example 1 were repeated excepting using 0.48 part of stearyl amine (as amine in the powdered resin) in place of 0.32 part of laurylamine, to obtain an aqueous coating composition.

EXAMPLE 3

The same procedures as stated in Example 1 were repeated excepting using 0.16 part of hexylamine (as amine in the powdered resin) in place of 0.32 part of laurylamine, to obtain an aqueous coating composition.

EXAMPLE 4

The same procedures as stated in Example 1 were repeated excepting using 0.16 part of dodecamethylene diamine (as amine in the powdered resin) in place of 0.32 part of lauryl amine, to obtain an aqueous coating composition.

EXAMPLE 5

The same procedures as stated in Example 1 were repeated excepting using 0.32 part of DMAEE (dimethyl-2-(2'-hydroxyethoxy)ethylamine) (as amine in the powdered resin) in place of 0.32 part of laurylamine, to obtain an aqueous coating composition.

COMPARATIVE EXAMPLE 1

(1) Preparation of resinous powder:

Resinous powder was prepared as in Example 1 using 8 parts of Finedic M 6103 and 8 parts of Epicoat #1004, but not BF-10 and laurylamine.

(2) Preparation of powder paste:

Powder paste was prepared as in Example 1 but using 32 parts of the resinous powder of the preceding paragraph (1).

(3) Preparation of pigment paste:

The same pigment paste as stated in example 1 was used.

(4) Preparation of aqueous coating composition:

From 104 Parts of the powder paste of (2), 126 parts of pigment paste of (3) and 20 parts of Cymel 300, an aqueous coating composition was prepared as in Example 1.

(5) Coating test:

The similar coating test as stated in Example 1 was carried out.

COMPARATIVE EXAMPLE 2

An aqueous coating composition was prepared as in Example 1 but using 8 parts of Finedic M 6103, 8 parts of Epicoat #1004 and 10 parts of BF-10 only.

COMPARATIVE EXAMPLE 3

An aqueous coating composition was prepared as in Example 1 but using 8 parts of Finedic M 6103, 8 parts of Epicoat #1004, 10 parts of BF-10 and 0.06 part of laurylamine.

COMPARATIVE EXAMPLE 4

(1) Preparation of resinous powder:

8 Parts of Finedic M 6103, 8 parts of Epicoat #1004, 10 parts of BF-10 and 0.8 part of lauarylamine were mixed and fused together in Ko-kneader at 150° C. After cooling, the product was pulverized and sieved to obtain a resinous powder having a mean diameter of less than 105μ.

(2) Preparation of powder paste:

The powder composition of (1) was subjected to the dispersion procedure as in example 1, but since the grain size was more than 100μ (measured by grindometer, Method A), a stable dispersion could not be obtained. Even after the treatment in a paint conditioner and fluid energy mill, no good results were obtained.

EXAMPLE 6 (DISPERSION IN PAINT CONDITIONER)

Powder paste was prepared as in Example 1 but using a paint conditioner in place of a disperser, for 50 minutes. A stable paste was obtained, grain size being less than 30μ (grindometer Method A). An aqueous coating composition was prepared as in Example 1 with this powder paste.

EXAMPLE 7 (JET MILL)

Resinous powder was prepared as in Example 1 and then subjected to jet milling to give grain size of less than 30μ.

Preparation of powder paste:

42 Parts of aqueous polyester resin varnish of Example 1 and 30 parts of deionized water were mixed together and to this were added gradually, while stirring, 52 parts of the resinous powder abovementioned, to obtain a stable paste having a mean grain size of less than 30μ (measured by grindometer, Method A). An aqueous coating composition was prepared with this paste as in Example 1.

The similar test as stated in Example 1 was carried out with the respective coating composition given in Examples and Comparative Examples and the results obtained are shown in Table 1.

EXAMPLE 8

Preparation of coating composition (1)

46 Grams of aqueous resin varnish of Table 2 were dissolved in 30 g of deionized water and to this, while keep stirring and heating, were gradually added 34 g of resinous fine powder (1) of Table 2 and the mixture was stirred well at 70° C. for 15 minutes. A stable dispersion was obtained, whose neutralization rate was found to be 47%.

To the abovementioned dispersion liquid, were added 166 g of the pigment dispersion paste of the Reference example 1 and 20 g of hexamethoxy methylol melamine (HMMM) and mixed well to obtain a coating composition. The characteristics of the composition were: non-volatile content 64 wt%, Stormer viscosity 110 Ku/25° C., and solid weight ratio of resinous fine powder/aqueous resin varnish 34/66.

TABLE 2

| | aqueous resin varnish | acid value | OH number | base material for neutraliz. | neutral. rate (%) | NV wt % | MW |
|---|---|---|---|---|---|---|---|
| (1) | polyester resin | 55 | 35 | DMAMP | 80 | 50 | 1360 |
| (1') | polyester resin | 55 | 35 | DMEA | | | |
| (2) | maleic polybutadiene | 95 | — | DMEA | 80 | 30 | 1200 |
| (3) | polyester resin | 55 | 35 | DEA | 80 | 50 | 1360 |
| (4) | polyester resin | 55 | 35 | DMAEE | 80 | 50 | 1360 |
| (5) | polyester resin | 55 | 35 | TEA | 80 | 50 | 1360 |
| (6) | polyester resin | 55 | 35 | aq. ammonia | 80 | 50 | 1360 |

TABLE 1

| | solid weight ratio of resin · powder/aq. polyester resin | epoxy resin ring-opening rate (%) | maximum film thickness (μ), no pinholes | | | |
|---|---|---|---|---|---|---|
| | | | after dilution | heating at 40° C. for | | |
| | | | | 10 days | 20 days | 30 days |
| Example | | | | | | |
| 1 | 43/57 | 20 | 60 | 60 | 55 | 50 |
| 2 | 43/57 | 18 | 65 | 60 | 55 | 50 |
| 3 | 43/57 | 19 | 60 | 50 | 45 | 40 |
| 4 | 43/57 | 16 | 58 | 53 | 45 | 40 |
| 5 | 43/57 | 24 | 55 | 50 | 40 | 40 |
| 6 | 43/57 | 20 | 55 | 52 | 50 | 45 |
| 7 | 43/57 | 20 | 60 | 58 | 55 | 48 |
| Com. Ex. 1 | 43/57 | 4 | 50 | 20 | less than 10 | |
| Com. Ex. 2 | 43/57 | 5 | 60 | 53 | 37 | 20 |
| Com. Ex. 3 | 43/57 | 8 | 58 | 55 | 40 | 20 |
| Com. Ex. 4 | 43/57 | 55 | — | — | — | — |

REFERENCE EXAMPLE 1

Preparation of pigment dispersion paste (1):

To 46 g of aqueous resin varnish (1) shown in Table 2, were added 30 g of deionized water and 90 g of rutile-type titanium oxide pigment and the mixture was subjected to preliminary mixing and then to mix-dispersion in a paint conditioner at room temperataure for 40 minutes with glass beads. Thus obtained paste was found to be well dispersed and had the characteristics: grain size less than 10μ, Stormer viscosity 100 Ku/25° C. and non-volatile content 68%.

TABLE 3

| resinous fine powder | acid value | grain size μ | Tg °C. | Molec. weight | epoxy equiv. |
|---|---|---|---|---|---|
| (1) polyester resin Finedic M 6107 manf. by Dainippon Ink Co., Ltd. | 53 | 104> | 109 | 3800 | — |
| (2) polyester resin Finedic M 6103 manf. by Dainippon Ink Co., Ltd. | 76 | 104> | 108 | 3000 | — |
| (3) epoxy resin Epicoat 1004 manuf. by Shell Chem. Co.) | — | 104> | 100 | 1400 | 925 |

EXAMPLES 9~16 AND COMPARATIVE EXAMPLES 5~7

Coating compositions were prepared as in Example 8, using aqueous varnishes of Table 2 and resinous fine powders of Table 3, the details being shown in Table 4. These compositions were stored at 40° C. for 10 days and thereafter, subjected to a stability test and the results obtained were shown in Table 5. Application characteristics of these compositions on dull steel plates were also evaluated and the results were shown in Table 5. In the abovementioned test, stability of the coating composition was evaluated from the following standards:

◎ . . . no abnormality (viscosity change less than 5 Ku, no precipitation)

Δ . . . increase in viscosity

X . . . precipitation

TABLE 4

| | Example | | | | | | | | Comparative Example | | |
|---|---|---|---|---|---|---|---|---|---|---|---|
| | 9 | 10 | 11 | 12 | 13 | 14 | 15 | 16 | 5 | 6 | 7 |
| aq. varnish used | (1') | (1') | (1') | (1) | (1) | (2) | (4) | (1) | (5) | (6) | (5) |
| amounts (g) | 46 | 46 | 46 | 46 | 46 | 76 | 46 | 46 | 46 | 46 | 46 |
| deion. water (g) | 30 | 30 | 30 | 30 | 30 | 0 | 30 | 30 | 30 | 30 | 30 |
| resin. powder used | (1) (3) | (1) (3) | (1) (3) | (2) (3) | (1) (3) | (1) (4) | (1) (3) | (1) (3) | (1) | (1) (3) | (1) (3) |
| amounts (g) | 24 10 | 24 10 | 15 19 | 24 10 | 12 10 | 24 10 | 24 10 | 24 10 | 34 | 24 10 | 24 10 |
| basic compound | — | DMEA | DMEA | — | — | — | — | — | — | — | TEA |
| amounts (g) | — | 3.4 | 1.0 | — | — | — | — | — | — | — | 1.1 |
| disper. temp. × time (°C. × minut.) | 70 × 15 | 70 × 15 | 70 × 15 | 70 × 15 | 60 × 15 | 60 × 15 | 60 × 15 | 50 × 15 | 70 × 15 | 70 × 15 | 60 × 15 |
| neutral. rate of total carboxylic acids (%) | 53 | 110 | 80 | 47 | 64 | 53 | 53 | 53 | 47 | 53 | 80 |
| pigment disper. paste | (1) | (1) | (4) | (1) | (1) | (3) | (1') | (1) | (5) | (1') | (5) |
| aq. varnish used amounts (g) | 166 | 166 | 166 | 166 | 166 | 166 | 166 | 166 | 166 | 166 | 166 |
| HMMM (g) | 20 | 20 | 20 | 20 | 20 | 20 | 20 | 20 | 20 | 20 | 20 |
| Coating composition non-volatile (wt %) | 64 | 64 | 64 | 64 | 62 | 64 | 64 | 64 | 64 | 64 | 64 |
| viscosity (Ku/25° C.) | 108 | 110 | 105 | 105 | 100 | 110 | 105 | 98 | 110 | 107 | 98 |
| solid weight ratio of resinous powder/aq. resin varnish | 34/66 | 34/66 | 34/66 | 34/66 | 25/75 | 34/66 | 34/66 | 34/66 | 34/66 | 34/66 | 34/66 |

TABLE 5

| coat. composition | stability* | maximum film thickness exhibit. pinhole resis. | | maximum film thickness exhibit. sagging resist. | |
|---|---|---|---|---|---|
| | | initial | elap. time | initial | elap. time |
| Example | | | | | |
| 8 | ○ | 55μ | 50μ | 70μ | 65μ |
| 9 | ○ | 60 | 60 | 60 | 70 |
| 10 | ○ | 65 | 60 | 55 | 60 |
| 11 | ○ | 60 | 58 | 60 | 65 |
| 12 | ○ | 55 | 50 | 65 | 60 |
| 13 | ○ | 55 | 50 | 60 | 50 |
| 14 | ○ | 60 | 55 | 65 | 60 |
| 15 | ○ | 60 | 60 | 55 | 55 |
| 16 | ○ | 55 | 50 | 65 | 60 |
| Comparative Example | | | | | |
| 5 | △ | 40 | 25 | 60 | 70 |
| 6 | △ | 30 | 15 | 60 | 55 |
| 7 | × | 35 | 20 | 70 | 65 |

*40° C. × 20 days

What is claimed is:

1. An aqueous coating composition comprising water insoluble resinous powder (I), base neutralization aqueous resin (II) and pigment and wherein said water insoluble resinous powder is composed of polymer obtained by reacting a mixture of an epoxy resin and a resin having an epoxy reactive functional group, or a resin having both epoxy groups and epoxy reactive functional groups, with an amine in an amount which is sufficient enough to cause ring-opening of 10 to 50% of the total epoxy groups contained.

2. The composition according to claim 1 wherein the solid weight ratio of (I):(II) is 2:98 to 98:2.

3. The composition according to claim 1 wherein the amine is reacted in an amount sufficient to cause ring-opening of 15 to 30% of the total epoxy groups contained.

4. The composition according to claim 1 wherein the amine has a boiling point higher than the melting temperature of resins for the resinous powder.

5. The composition according to claim 4 wherein the amine has a boiling point of 150° C. or higher.

6. The composition according to claim 5 wherein the amine has a boiling point of 150° to 400° C.

7. The composition according to claim 1 wherein the amine is aliphatic monoamine having more than 12 carbon atoms, which is solid at room temperature.

8. A method for preparing aqueous coating composition comprising dispersing powdered resin which is the reaction product of a mixture of an epoxy resin and a resin having epoxy reactive functional group, or a resin having both epoxy groups and epoxy reactive functional groups, with an amine, in an amount sufficient to cause ring-opening of 10 to 50% of the total epoxy groups contained, in an aqueous medium containing a base neutralization aqueous resin, and compounding thus obtained product with pigment.

9. An aqueous coating composition comprising a resinous powder (I) containing carboxyl groups, basic compound (II), aqueous resin (III) and with or without a compound which is mutually reactive with at least one of the resin powder (I) and aqueous resin (III), the amount of said basic compound (II) corresponding to 0.3 to 1.2 equivalents based on the total amount of carboxyl groups in (I) and (III) and the solid weight ratio of (I):(III) being 2:98 to 98:2, and wherein at least 20% of said basic compound (II) is a compound having a boiling point of 150° C. or higher.

10. The composition according to claim 9 wherein the basic compound (II) is one having a boiling point of 150°~400° C.

11. The composition according to claim 2 wherein the amine is aliphatic monoamine having more than 11 carbon atoms, which is solid at room temperature.

12. The composition according to claim 3 wherein the amine is aliphatic monoamine having more than 12 carbon atoms, which is solid at room temperature.

13. The composition according to claim 4 wherein the amine is aliphatic monoamine having more than 12 carbon atoms, which is solid at room temperature.

14. The composition according to claim 5 wherein the amine is aliphatic monoamine having more than 12 carbon atoms, which is solid at room temperature.

15. The composition according to claim 6 wherein the amine is aliphatic monoamine having more than 12 carbon atoms which is solid at room temperature.

16. The composition according to claim 1 wherein the base neutralization aqueous resin is a, polyester resin, maleic oil resin, maleic polyalkadiene resin, epoxy resin, acrylic resin or urethane resin.

17. The composition according to claim 1 wherein there is employed one or more additives.

18. The composition according to claim 17 wherein the additive is a hardener.

19. The composition according to claim 9 wherein the base neutralization aqueous resin is an alkyd resin is a polyester resin, maleic oil resin, maleic polyalkadiene resin, epoxy resin, acrylic resin or urethane resin.

20. The composition according to claim 9 wherein there is employed one or more additives.

21. The composition according to claim 20, wherein the additive is a hardener.

* * * * *